No. 863,386. PATENTED AUG. 13, 1907.
M. HALLANAN.
HOOF PAD.
APPLICATION FILED MAY 11, 1906.
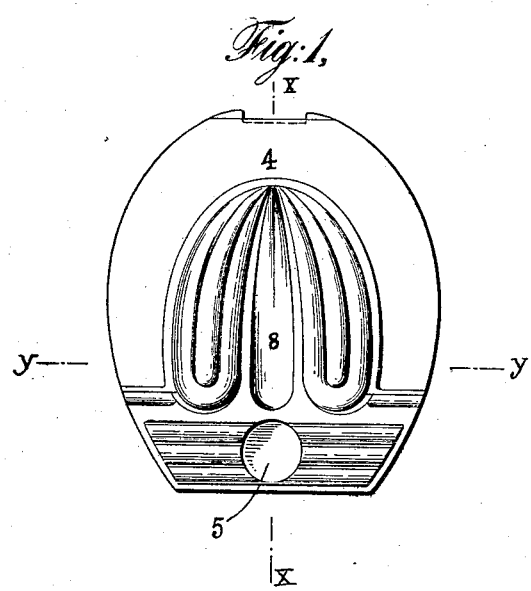
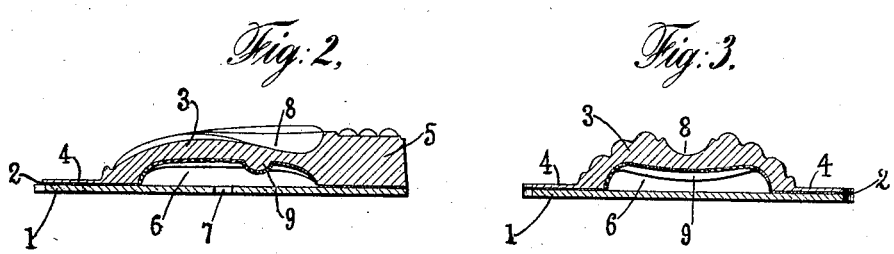
WITNESSES: Michael Hallanan, INVENTOR,
BY Robt. B. Kilgore,
ATTORNEY.

UNITED STATES PATENT OFFICE.

MICHAEL HALLANAN, OF NEW YORK, N. Y.

HOOF-PAD.

No. 863,386.

Specification of Letters Patent.

Patented Aug. 13, 1907.

Application filed May 11, 1906. Serial No. 316,352.

To all whom it may concern:

Be it known that I, MICHAEL HALLANAN, a citizen of the United States, residing at New York city, in the county of New York and State of New York, have invented certain new and useful Improvements in Hoof-Pads, of which the following is a specification.

The object of my invention is to so construct a pneumatic hoof pad that cracking and splitting of the elastic portion will be reduced to a minimum.

Heretofore pneumatic pads have not been a commercial success because the constant collapsing and expanding of the elastic portion under the weight of the animal has caused it to split and crack and quickly become useless. By my invention a compensator is provided for the elastic portion of the pad which takes up the compression when it collapses and gives a quick expansion when the pressure is relieved.

Pads embodying my invention are no softer than the ordinary pneumatic pad so they afford the same support to the animal.

In the accompanying drawings like reference characters refer to like parts throughout.

Figure 1 is a face view of my improved pad; Fig. 2 a sectional view of the structure of Fig. 1 on the line $x\,x$; Fig. 3 a sectional view of the structure of Fig. 1 on the line $y\,y$.

The pad has the usual backing of leather 1, the intermediate layer of canvas 2, and the facing of rubber 3, the whole being secured together.

The flange 4 extends around the toe and quarters to receive the metal shoe. The heel block 5 is solid and extends the full width of the heel.

The pneumatic chamber 6 is formed under the hollow of the hoof and has the leather backing 1 and the rubber facing 3 for its walls. The leather back 1 may be provided with the opening 7 which acts as a relief valve when the pad is collapsed or compressed.

So far the pad is similar to the ordinary pneumatic pad. I do not, however limit myself to the precise embodiment shown and described as it is simply my preferred form.

My invention consists in providing the facing 3 of the pad with the longitudinal depression or channel 8 which acts as a compensator when the pad is compressed. This channel is preferably made of gradually increasing depth from front to rear to proportion the compensation to the amount of motion of the rubber facing. This channel is relatively broad as compared with the corrugations on either side of it and is comparatively thin, the most yielding part of the pad being the channel, especially the middle part thereof. The rubber on either side of this channel or depression 8 is compressed under the weight of the animal and the pneumatic chamber collapses the thin part of the pad at the bottom of the channel acting as a hinge on which the parts turn. This channel or depression therefore acts as a compensator in relieving the rubber facing from strains which heretofore have resulted in cracking and splitting.

A bar 9 is molded across the elastic facing 3 on the inside of the chamber 6, transversely to the channel 8, for the purpose of stiffening the chamber and assisting in the quick return of the rubber facing to its initial condition after compression.

Having thus described my invention what I claim as new and desire to secure by Letters Patent is:—

1. A hoof pad having a convex rubber facing forming a pneumatic cushion on the inside, provided with a series of longitudinal grooves and a central widened groove in the exterior face.

2. A hoof pad having a convex rubber facing forming a pneumatic cushion on the inside, provided with a series of longitudinal grooves and a central widened groove gradually increasing in depth from front to rear in the exterior face.

3. A hoof pad having a convex rubber facing forming a pneumatic cushion on the inside provided with a series of longitudinal grooves a central widened groove in the exterior face; and an integral rib or bar on the inner face of the pad, within the chamber, at substantially right angles to the grooves.

4. A hoof pad having a convex rubber facing forming a pneumatic cushion on the inside provided with a series of longitudinal grooves, a central widened groove gradually increasing in depth from front to rear in the exterior face; and an integral rib or bar on the inner face of the pad, within the chamber, at substantially right angles to the grooves.

5. A hoof pad having a convex rubber facing forming a pneumatic cushion on the inside provided with a series of longitudinal grooves and a central widened groove in the exterior face; and a backing of leather to which said rubber facing is secured.

6. A hoof pad having a convex rubber facing forming a pneumatic cushion on the inside provided with a series of longitudinal grooves and a central widened groove gradually increasing in depth from front to rear in the exterior face; and a backing of leather to which the rubber facing is secured.

7. A hoof pad having a convex rubber facing forming a pneumatic chamber on the inside provided with a series of longitudinal grooves and a central widened groove gradually increasing in depth from front to rear in the exterior face; an integral rib or bar on the inner face of the pad, within the chamber, at substantially right angles to the grooves; and a leather backing to which the rubber facing is secured.

8. A hoof pad having a convex rubber facing, a backing of leather and an intermediate layer of canvas, the whole being secured together; the facing forming a pneumatic cushion on the inside and provided with a series of longitudinal grooves and a central widened groove in the exterior face; the facing also having a solid heel block extending the full width thereof and an integral bar or rib, within the chamber, at substantially right angles to the grooves; a vent leading from the pneumatic chamber and a flange around the toe and quarters adapted to receive a metal shoe.

In testimony whereof I have affixed my signature in presence of two witnesses.

MICHAEL HALLANAN.

Witnesses:
 ROBT. B. KILLGORE,
 O. H. HOPWOOD.